(12) United States Patent
Therrien et al.

(10) Patent No.: US 11,112,937 B2
(45) Date of Patent: Sep. 7, 2021

(54) INCIDENT MANAGEMENT SYSTEM AND METHOD WITH CARD-BASED WORKFLOW INTEGRATION AND MAP THUMBNAIL HOT ZONES

(71) Applicant: MOTOROLA SOLUTIONS, INC., Chicago, IL (US)

(72) Inventors: Nicolas Therrien, Gatineau (CA); Erik Fournier, Orleans (CA); Chantal Levert, Ottawa (CA); Jean-Yves Poulin, Gatineau (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/731,466

(22) Filed: Dec. 31, 2019

(65) Prior Publication Data
US 2021/0200424 A1    Jul. 1, 2021

(51) Int. Cl.
G06F 3/0482    (2013.01)
G06F 3/0481    (2013.01)
G06Q 50/26    (2012.01)
H04M 3/51    (2006.01)

(52) U.S. Cl.
CPC ........ G06F 3/04817 (2013.01); G06F 3/0482 (2013.01); G06Q 50/265 (2013.01); H04M 3/5116 (2013.01); H04M 2242/04 (2013.01)

(58) Field of Classification Search
CPC . G06F 3/04817; G06F 3/0482; G06Q 50/265; H04M 3/5116; H04M 2242/04
See application file for complete search history.

(56) References Cited

U.S. PATENT DOCUMENTS

| | | | | |
|---|---|---|---|---|
| 5,331,549 | A * | 7/1994 | Crawford, Jr. | G16H 40/63 600/513 |
| 6,563,910 | B2 * | 5/2003 | Menard | H04L 63/0428 379/42 |
| 7,031,714 | B1 * | 4/2006 | Rayburn | H04M 3/367 455/445 |
| 7,515,693 | B2 * | 4/2009 | Salafia | H04M 3/5116 379/37 |
| 7,646,854 | B2 * | 1/2010 | Anderson | H04W 4/90 379/45 |
| 7,646,858 | B2 * | 1/2010 | Salafia | H04M 3/5116 379/201.01 |
| 8,448,070 | B2 | 5/2013 | Dailey | |

(Continued)

*Primary Examiner* — Phenuel S Salomon
(74) *Attorney, Agent, or Firm* — Michael Best & Friedrich LLP

(57) ABSTRACT

An incident management system with graphical user interface mechanisms for control of the routing of incoming calls and other information regarding a plurality of ongoing incidents. Thumbnail icons, each corresponding to a different defined geographic area, are displayed and, in response to a user input selecting a thumbnail icon, a map is displayed identifying a defined geographic area corresponding to the selected thumbnail icon with a plurality of call icons and at least one incident icon. The call icons each correspond to a different active incoming call from within the defined geographic area and are each positioned on the map accordingly. At least one of the displayed call icons is assigned to an incident group and an incident icon is displayed for each ongoing incident managed by the system to which at least one displayed call icon has been assigned.

20 Claims, 15 Drawing Sheets

(56) References Cited

U.S. PATENT DOCUMENTS

| | | | |
|---|---|---|---|
| 8,538,374 B1* | 9/2013 | Haimo | G01S 5/0027 455/404.2 |
| 8,976,939 B1* | 3/2015 | Hamilton | H04M 3/5116 379/45 |
| 9,426,638 B1* | 8/2016 | Johnson | G08B 25/016 |
| 9,513,770 B1* | 12/2016 | Sun | G06F 3/0482 |
| 9,875,643 B1* | 1/2018 | Sarna, II | G08B 25/14 |
| 2002/0075330 A1* | 6/2002 | Rosenzweig | G06F 16/58 715/854 |
| 2006/0167629 A1* | 7/2006 | Ishii | G01C 21/32 701/455 |
| 2007/0103294 A1* | 5/2007 | Bonecutter | G08B 21/10 340/539.18 |
| 2007/0198951 A1* | 8/2007 | Frank | G06F 16/40 715/838 |
| 2008/0052142 A1 | 2/2008 | Bailey et al. | |
| 2009/0067586 A1* | 3/2009 | Fano | H04M 3/51 379/49 |
| 2010/0262928 A1* | 10/2010 | Abbott | H04M 1/72552 715/769 |
| 2011/0106429 A1* | 5/2011 | Poppen | G01C 21/3617 701/533 |
| 2011/0161875 A1* | 6/2011 | Kankainen | G06F 3/0481 715/810 |
| 2011/0181443 A1* | 7/2011 | Gutierrez | G01C 21/3691 340/990 |
| 2012/0317507 A1* | 12/2012 | Gutierrez | H04N 7/181 715/771 |
| 2014/0368601 A1* | 12/2014 | deCharms | H04L 67/26 348/14.02 |
| 2015/0301695 A1* | 10/2015 | Leong | G06F 16/5866 715/838 |
| 2015/0317809 A1* | 11/2015 | Chellappan | G01C 21/362 455/404.1 |
| 2016/0037319 A1* | 2/2016 | Hafeman | H04W 4/90 455/404.2 |
| 2017/0010783 A1* | 1/2017 | Beattie | H04L 67/306 |
| 2017/0086040 A1 | 3/2017 | Hong et al. | |
| 2017/0153790 A1* | 6/2017 | Mohanam | H04W 4/90 |
| 2018/0199179 A1* | 7/2018 | Rauner | G08B 25/10 |

* cited by examiner

INCIDENT MANAGEMENT SYSTEM AND METHOD WITH CARD-BASED WORKFLOW INTEGRATION AND MAP THUMBNAIL HOT ZONES

BACKGROUND OF THE INVENTION

Some incident/emergency response systems are configured to receive incoming calls regarding emergency situations and/or other incidents (for example, 9-1-1 call centers). Calls are answered by a person who then records information about the incident. Information obtained from the incoming calls is used to manage a response to the incident including, for example, dispatching appropriate personnel to attend to the incident. Computer-based systems may be used to record and communicate information regarding an ongoing incident.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
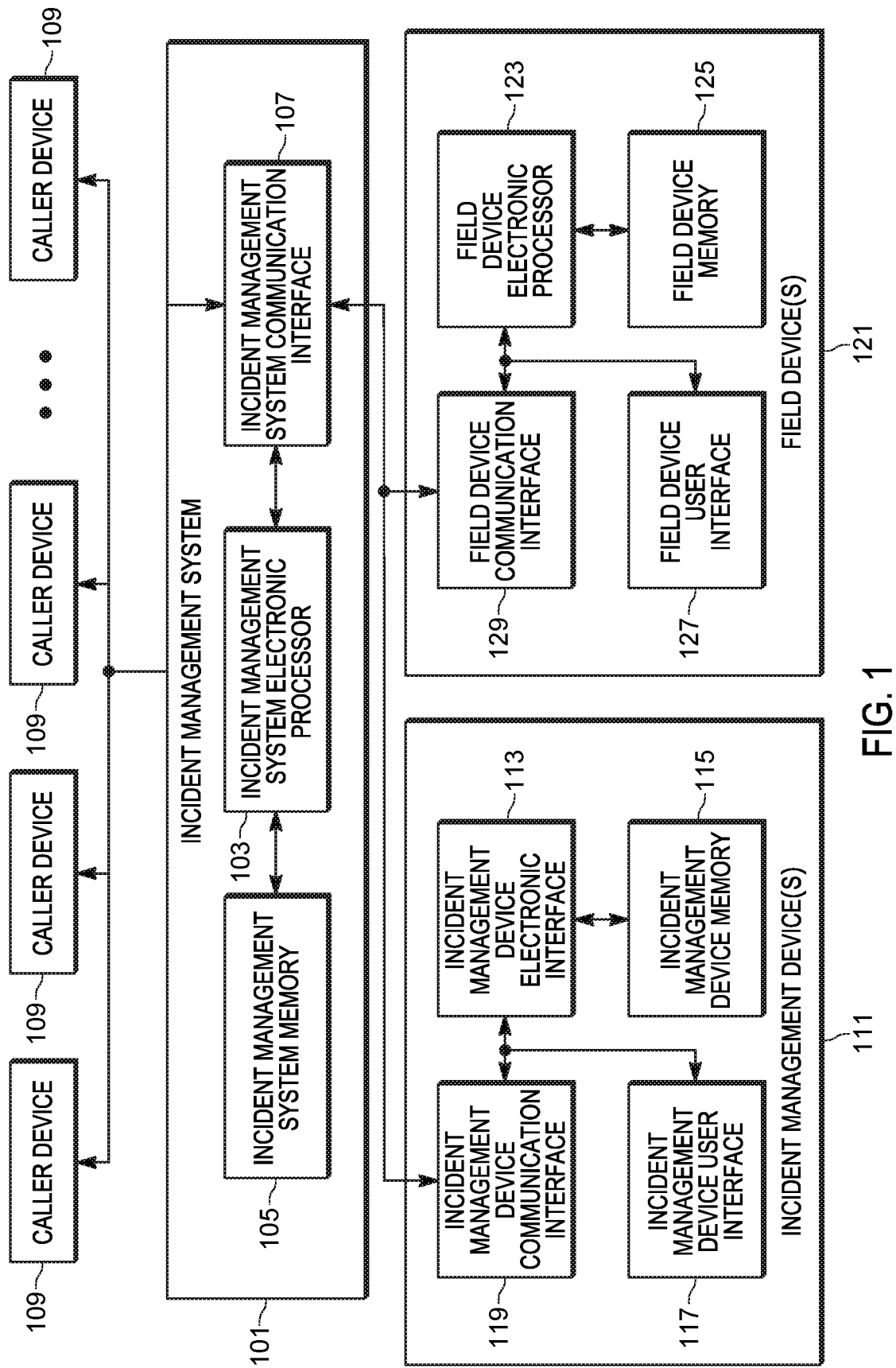
FIG. 1 is a block diagram of a computer-based incident management system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Methods and systems are provided in this disclosure for managing an incident (e.g., a coordinated response to an emergency situation) using a computer-based system to receive incoming calls and to route the incoming call (and/or information from the incoming call) to appropriate users. One or more thumbnail icons, each corresponding to a different defined geographic area, are displayed on a graphical display. In response to a user input selecting the thumbnail icon, a first user interface screen is displayed on the graphical display. The first user interface screen includes the one or more thumbnail icons, a map identifying a defined geographic area corresponding to the selected thumbnail icon, a plurality of call icons, and at least one incident icon. The call icons each correspond to a different one of a plurality of active incoming calls received from within the defined geographic area corresponding to the selected thumbnail icon and are each positioned on the map according to a geographic location of the active incoming call. At least one of the displayed call icons is assigned to an incident group and an incident icon is displayed for each ongoing incident managed by the system to which at least one displayed call icon has been assigned. In some implementations, no call icons are displayed on the first user interface screen when there are no active incoming calls received from within the defined geographic area corresponding to the selected thumbnail icon and, similarly, no incident icons are displayed on the first user interface screen when there are no ongoing incidents to which at least one displayed call icon has been assigned.

The incident management system is configured to automatically define smaller geographic areas (referred to herein as "hot zones") and to filter displayed information on the first user interface based on the defined hot zones. The incident management system also uses defined "hot zones" and incident assignments to route incoming calls to a particular call taker and, in some implementations, to derive real-time information regarding the geographic scope of an ongoing incident.

FIG. 1 illustrates an example of an incident management system 101. The incident management system 101 includes an incident management system electronic processor 103 and an incident management system memory 105. The incident management system memory 105 is a non-transitory computer-readable memory and, in various implementations, may include one or more local memory devices and/or remote memory devices (e.g., remote storage server, cloud storage, etc.). The incident management system memory 105 stores data and instructions that, when executed by the incident management system electronic processor 103, provide the functionality of the incident management system 101 including, for example, the functionality described herein. Similarly, although the incident management system 101 illustrated in the example of FIG. 1 is shown as a single component, in various different implementations, the incident management system 101 may be provided as multiple different component systems.

The incident management system 101 also includes an incident management system communication interface 107 configured to provide electronic communication between the incident management system 101 and other devices through wired and/or wireless communication mechanisms (e.g., private local network, public telephone system, the Internet, etc.). In the example of FIG. 1, the incident management system 101 is configured to receive incoming calls from a plurality of different caller devices 109 each located at different geographic locations. For example, the incident management system 101 may be implemented as (or interface with) a municipal emergency call center (e.g., a 911 call center). The incoming calls to the incident management system 101 from the caller devices 109 are made to report information about a detected or observed incident. For example, the incoming call may be manually initiated by a user of the caller device by dialing an emergency response phone number (e.g., 9-1-1) or the incoming call may be initiated automatically in response to detection of an incident (e.g., by a sensor or camera).

The incident management system 101 is also communicative coupled (or selectively couplable) to one or more incident management devices 111 and one or more field devices 121. As shown in the example of FIG. 1, each incident management device 111 includes an incident management device electronic processor 113 and an incident management device memory 115. The incident management device memory 115 stores data and computer-executable instructions that, when executed by the incident management device electronic processor 113, provide the functionality of the incident management device 111. The incident management device 111 also includes one or more incident management device user interface components 117 including, for example, a graphical display (e.g., an LED display screen), a user input device (e.g., a keyboard, mouse, touch-sensitive display), an output speaker, and/or a microphone. An incident management device communication interface 119 is configured to provided wired and/or wireless communication between the incident management device 111 and other computer-based systems including, for example, the incident management system 101, a field device 121, and/or other incident management devices 111.

Similarly, in the example of FIG. 1, each field device 121 includes a field device electronic processor 123 and a field device memory 125. The field device memory 125 stores data and computer-executable instructions that, when executed by the fieldnt device electronic processor 123, provide the functionality of the field device 121. The field device 121 also includes one or more field device user interface components 127 including, for example, a graphical display (e.g., an LED display screen), a user input device (e.g., a keyboard, mouse, touch-sensitive display), an output speaker, and/or a microphone. A field device communication interface 129 is configured to provided wired and/or wireless communication between the field device 121 and other computer-based systems including, for example, the incident management system 101, an incident management device 111, and/or other field devices 121.

An incident management device 111 may include, for example, a user terminal operated by a call-taker or dispatcher. In some implementations, the incident management device 111 is configured to connect to one or more incoming calls so that the user of the incident management device 111 can communicate verbally with the caller (e.g., through the incident management device user interface 117). The incident management device 111 is also configured to display information to the user regarding the incoming call, other active incoming calls, and/or ongoing incidents managed by the incident management system 101 and to receive input information & command from the user.

A field device 121 may include, for example, a portable computer and/or radio device carried in the field by response personnel that have been (or that can be) dispatched to the incident. Through the field device 121 a user can, in various different situations and implementations, communicate verbally with a caller (e.g., by selectively connecting the field device 121 to a caller device 109 through the incident management system 101) and/or a call-taker or dispatcher (e.g., by selectively connecting the field device 121 to an incident management device 111). In some implementations, the field device 121 may also be configured to receive information regarding an ongoing incident from the user of the field device 121 and/or display information regarding one or more incoming calls and/or ongoing incidents received by the field device 121 from the incident management system 101.

For an incident management system 101 that is configured to management multiple different incident concurrently, many incoming calls may be related to the same incident (e.g., a fire, a traffic accident, a medical emergency, etc.). To efficiently management the incident, it may be beneficial, for example, to route all of the calls relating to a single incident to the same call-taker or small group of call-takers assigned to the incident. However, without appropriate systems and technologies, it can be difficult for an incident management system to distinguish between incoming calls related to a particular incident and other unrelated incoming calls. It can also be difficult for a call-taker/dispatcher and response personnel to determine and continually monitor a geographic scope and location of an ongoing incident based only on information discerned from an incoming call. Various implementations of the incident management system 101, such as described in the examples below, provide graphical interface-based mechanisms for controlling the flow, routing, and display of information in the incident management system 101.

Figure 2:
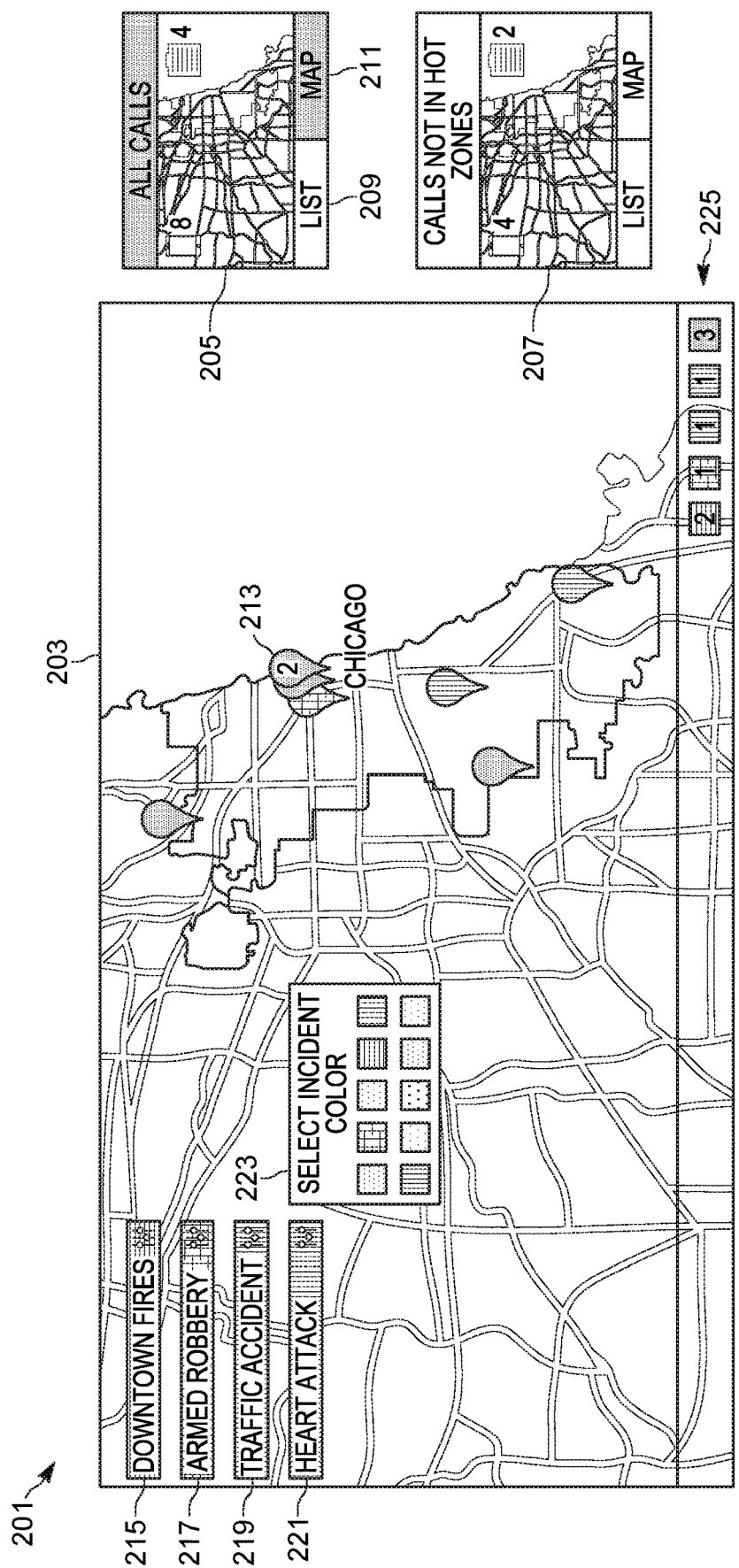
FIG. 2 is a map-view user interface displayed to a user of the incident management system of FIG. 1.

FIG. 2 illustrates an example of a "map-view" user interface 201 displayed, for example, on an incident management device user interface 117 screen/monitor when the incident management device 111 is communicatively coupled to the incident management system 101. The map-view user interface 201 includes a map 203 in the main area of the screen. The map 203 shows the locations of incoming/active calls (as described further below) and allows zooming in or out based on a user input. Along the right side of the map-view user interface 201 is a series of thumbnail icons arranged in a vertical series. In the specific example of FIG. 2, the displayed thumbnail icons include an "all calls" thumbnail icon 205 and a "calls not in hot zone" thumbnail icon 207. However, as described in further detail below, additional or different thumbnail icons may be displayed in other situations and in other implementations.

Each thumbnail icon includes a thumbnail image of a geographic area associated with the particular thumbnail icon and two numbers superimposed over the thumbnail image. For example, the "all calls" thumbnail icon shows the number eight (8) in the upper left corner of its thumbnail image next to a smaller icon of a mobile phone and shows the number four (4) in the upper right corner of its thumbnail image next to a smaller icon of a clipboard. The number displayed in the upper left corner of the thumbnail image (i.e., next to the icon of the mobile phone) indicates a number of incoming/active calls in the geographic area associated with the thumbnail icon. The number displayed in the upper left corner of the thumbnail image (i.e., next to the icon of the clipboard) indicates a number of ongoing incidents to which one or more calls in the defined geographic area associated with the thumbnail have been assigned. In the specific example of the "all calls" thumbnail icon 205 in FIG. 2, a total of eight incoming/active calls have been received from locations within the geographic area associated with the "all calls" thumbnail icon 205 and, of those eight incoming/active calls, one or more have been assigned to each of four different ongoing incidents.

Figure 3:
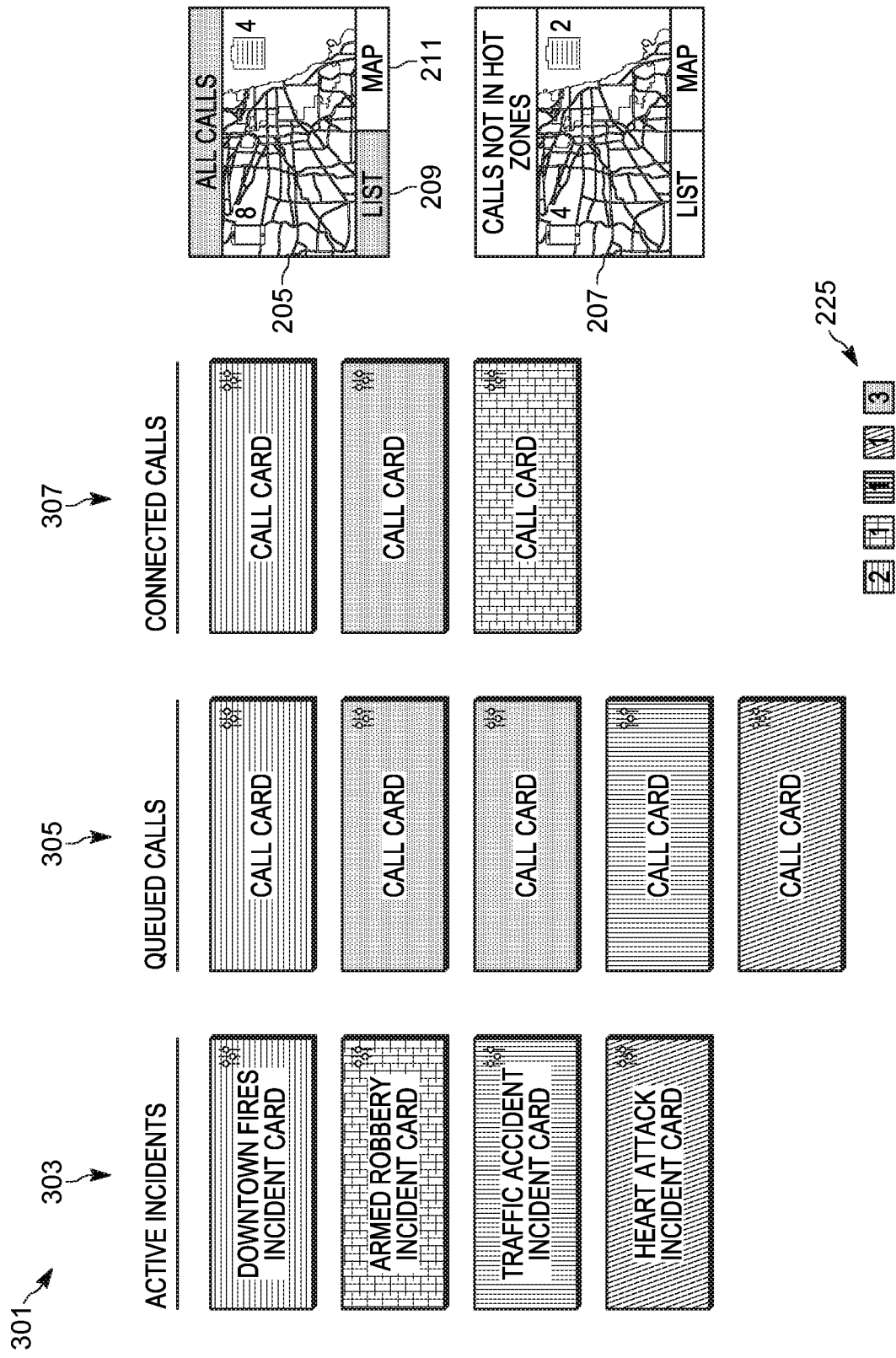
FIG. 3 is a list-view user interface displayed to a user of the incident management system of FIG. 1.

Each thumbnail icon also includes a "list" button 209 and a "map" button 211 positioned below the thumbnail image. The "list" button 209 and the "map" button 211 are configured to selectively navigate between a "list-view" user interface (e.g., as illustrated in FIG. 3) and the "map-view" user interface 201 for each of the different geographic areas associated with each different thumbnail icon as described in further detail below. In the examples set forth below, the list-view option (i.e., causing the list-view user interface to be displayed) and the map-view option (i.e., causing the map-view user interface to be displayed) are selected by use of the list button 209 and the map button 211, respectively. However, in other implementations, other mechanisms for selecting a list-view option and/or a map-view option may be provided via the user interface.

In the example of FIG. 2, the "map" button 211 for the "all calls" thumbnail icon 205 has been selected. Accordingly, the map 203 displayed on the screen is automatically zoomed to correspond with the geographic area associated with the "all calls" thumbnail icon 205. A plurality of call icons 213 are all displayed at locations on the map corresponding to a determined source location of an incoming/active call (e.g., as determined using a call location determining feature such as "Caller ID", cell phone triangulation, or based on a verbal indication received from the person placing the call to the incident management system 101). The call icons 213 displayed on the map 203 are color-coded based on an incident assignment so that the color of the call icon indicates an assigned incident for the call icon. For example, blue call icons may be indicative of incoming calls associated with fire at a particular location; orange call icons may be indicative of incoming calls associated with an armed robbery incident; pink call icons may be indicative of incoming calls associated with a traffic accident incident; and purple call icons may be indicative of incoming calls associated with a heart attack incident. Additionally, another color (e.g., black) may be used to indicate call icons for incoming calls that have not yet been assigned to any incident.

When the source locations of multiple incoming calls are within a defined distance of each other (based on the current zoom level of the map 203), the system may be configured to display only a single call icon representing multiple different incoming calls. For example, in FIG. 2, two incoming calls have been associated with the same "downtown fires" incident and, due to the location of these two different calls, they are represented on the map 203 with a single call icon labeled with the number "2" (indicating that the call icon is representative of 2 different calls). This displayed number on the call icon can be increased beyond 2 to indicate even more incoming calls within a relatively smaller geographic area and, in some implementations, when the zoom level of the map is adjusted to "zoom in" on the geographic area near the call icon associated with multiple calls, then the system will replace the single displayed call icon with multiple different call icons each representative of different incoming calls.

In addition to displaying call icons 213 associated with each incoming/active call in the geographic area, the "map-view" user interface 201 also displays a series of incident icons each indicative of a different incident to which one or more calls in the displayed geographic area have been assigned. In the example of FIG. 2, four incident icons are displayed including a "downtown fire" incident icon 215, an "armed robbery" incident icon 217, a "traffic accident" incident icon 219, and a "heart attack" incident icon 221. The incident icons have the same color-coding color as the call icons for calls that have been assigned to the incident represented by the incident icon. For example, both the "traffic accident" incident icon 219 and the call icon indicative of an incoming call that has been assigned to the "traffic accident" incident are displayed on the map-view user interface 203 in the color pink.

Through the map-view user interface 201, the user (e.g., a dispatcher, a call taker, a supervisor, etc.) can associate incoming calls with existing or new incidents. The user may also adjust the color coding assigned to a particular incident, for example, using an "incident color" selection pop-up menu 223 as shown in the example of FIG. 2. In some implementations, this pop-up menu 223 is displayed when a user "right clicks" on an incident icon.

The map-view user interface 201 also includes an incident filter button bar 225 at the bottom of the screen. The incident filter button bar 225 includes an incident filter button for each different incident to which calls in the displayed geographic area have been assigned and an additional button for calls in the geographic area that have not been assigned to any incident. These incident filter buttons have the same color-coding as the call icons and the incident icons. The incident filter buttons each also display a number superimposed thereon indicating a number of calls within the displayed geographic area that are associated with the incident (or, in the case of the button for unassigned calls, the number of calls in the displayed geographic area that have not been assigned to any incident). As described further below, a user can selectively cause call icons associated with a particular incident to be removed from the display screen by selecting the corresponding incident filter button from the incident filter button bar 225. For example, to remove all of the call icons for calls that have not yet been assigned to an incident, the user selects the "black" button from the incident filter button bar 225.

The map-view user interface 201 provides for incident management functionality with a geographic-based context (including, for example, some of the functionality described below). However, in some situations and context, incident management functionality may be better provided in a list-based context in which calls and incidents are displayed in ordered lists instead of displayed as geographically placed icons on a map. Accordingly, by selecting the "list" button 209 for the "all calls" thumbnail icon 205, a user can selectively switch from the map-view user interface 201 of FIG. 2 (to a "list-view" user interface 301 illustrated in FIG. 3.

The list-view user interface 301 includes the same thumbnail icons (e.g., thumbnail icons 205, 207) and incident filter button bar 225 as the corresponding map-view user interface 201 for the same defined geographic area associated with the thumbnail icon (e.g., thumbnail icon 205). However, instead of showing a series of icon positioned geographically on the map 203, the list-view user interface 301 displays a series of list icons or "cards" arranged in three different columns including an "active incidents" column 303, a "queued calls" column 305, and a "connected calls" column 307. The active incidents column 303 includes an "incident card" for each ongoing incident to which at least one call from within the geographic area corresponding to the selected thumbnail 205 has been assigned. The queued calls column 305 displays a "call card" for each incoming call from within the geographic area corresponding to the selected thumbnail 205 that is queued and awaiting attention from a "call taker." The connected calls column 307 displays a "call card" for each incoming call from within the geographic area corresponding to the selected thumbnail 205 that is currently connected to a call taker and/or other incident response personnel.

The incident cards and call cards displayed in the list-view user interface 301 are also color-coded with the same color-coding scheme as in the map-view user interface 201. Accordingly, a user is able to quickly discern visually which call cards displayed in the list-view user interface 301 correspond to each particular ongoing incident. Also, as discussed further below, the user can user the incident filter button bar 225 to selectively remove call cards associated with a particular incident from the list-view user interface 301.

The incident cards and call cards displayed in the example of FIG. 3 provide a mechanism for tracking & managing connected and queued calls and also for accessing information regarding a particular ongoing incident or an active call. For example, by selecting an incident card from the active incidents column 303, a user can view information regarding an active incident including, for example, a number of active/incoming calls for that incident and status updates from response personnel in the field. By selecting a call card, a user can view information about the call including, for example, the name/location of the person placing the incoming call and a summary/notes of statements made by the caller. In some implementations, a user is able to join an ongoing connected call or answer a queued call by selecting the call card from the queued calls column 305 or the connected calls column 307.

Figure 4:
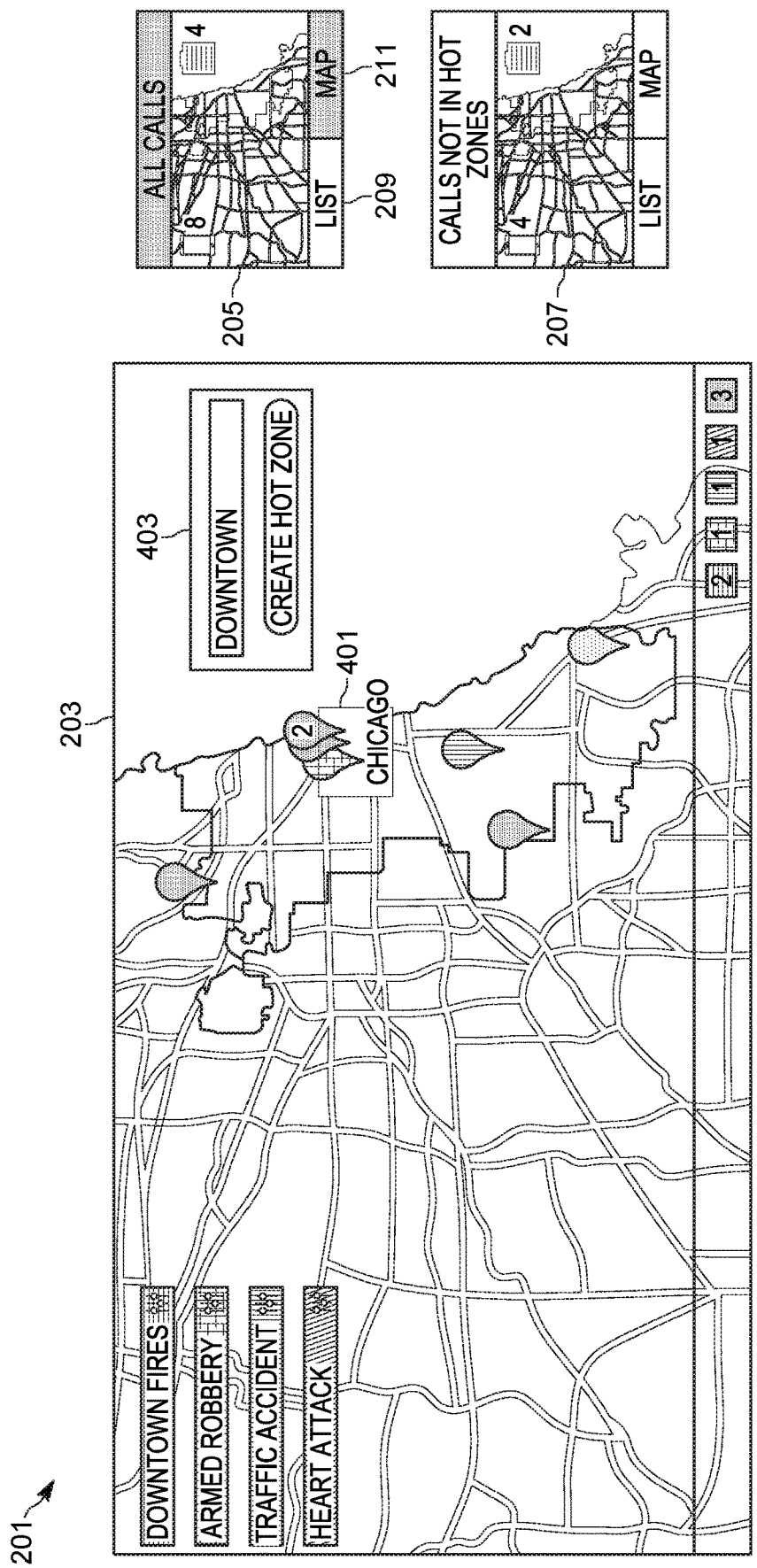
FIG. 4 is the map-view user interface of FIG. 2 showing an on-screen mechanism for creation of a new "Hot Zone" for incident management.

The example of FIG. 4 returns to the map-view user interface 201. Again, as discussed above in reference to FIG. 2, the map-view user interface 201 in this example only includes two thumbnail icons. However, the incident management system 101 is configured to provide improved incident management functionality by selectively creating new, smaller geographic areas (referred to herein as "Hot Zones") for call-routing and incident management based on the geographic context provided by the map-view user interface 201.

For example, in the geographic area associated with the thumbnail icon 205, two incoming calls have already been assigned to a "downtown fires" incident. If more incoming calls are to be received relating to this same "downtown fires" incident, it would be beneficial for those calls to be routed to the call taker (or group of call takers) that has responded to the other incoming calls relating to that same incident. It is likely that any such future incoming calls relating to this same incident would also come from locations nearby the other calls that have already been assigned to this incident. Therefore, after a Hot Zone is created, all new incoming calls from within that Hot Zone can be automatically routed by the system to a user (e.g., a dispatcher or caller taker) that is assigned to the Hot Zone and the particular ongoing incident. The dynamic Hot Zone functionality allows the system to adjust to real-time changes in the geographic context of ongoing incidents while also providing a filtered interface for quick visual context of the incident and access to information/calls relating to the incident in a way that is not overly complicated with information (e.g, icons) for unrelated incidents.

A new Hot Zone can be created automatically by the system by defining a geographic area based on the locations of incoming/active calls related to the same ongoing incident (i.e., an incident zone). Alternatively or additionally, the new Hot Zone can be created through the map-view user interface 201 based on a user input defining a sub-area within the displayed geographic area (i.e., a zone selection input). For example, in FIG. 4, a box 401 has been drawn around a geographic area on the map 203 (e.g., using a mouse or other input device of the incident management device user interface 117). After the Hot Zone geographic area has been defined (e.g., by the new box 401), the system displays a "pop-up" text-entry box 403 including a text field and a button. The user types a name for the new Hot Zone in the text field of the box 403 and then selects the "create hot zone" button to create the new Hot Zone.

Figure 5:
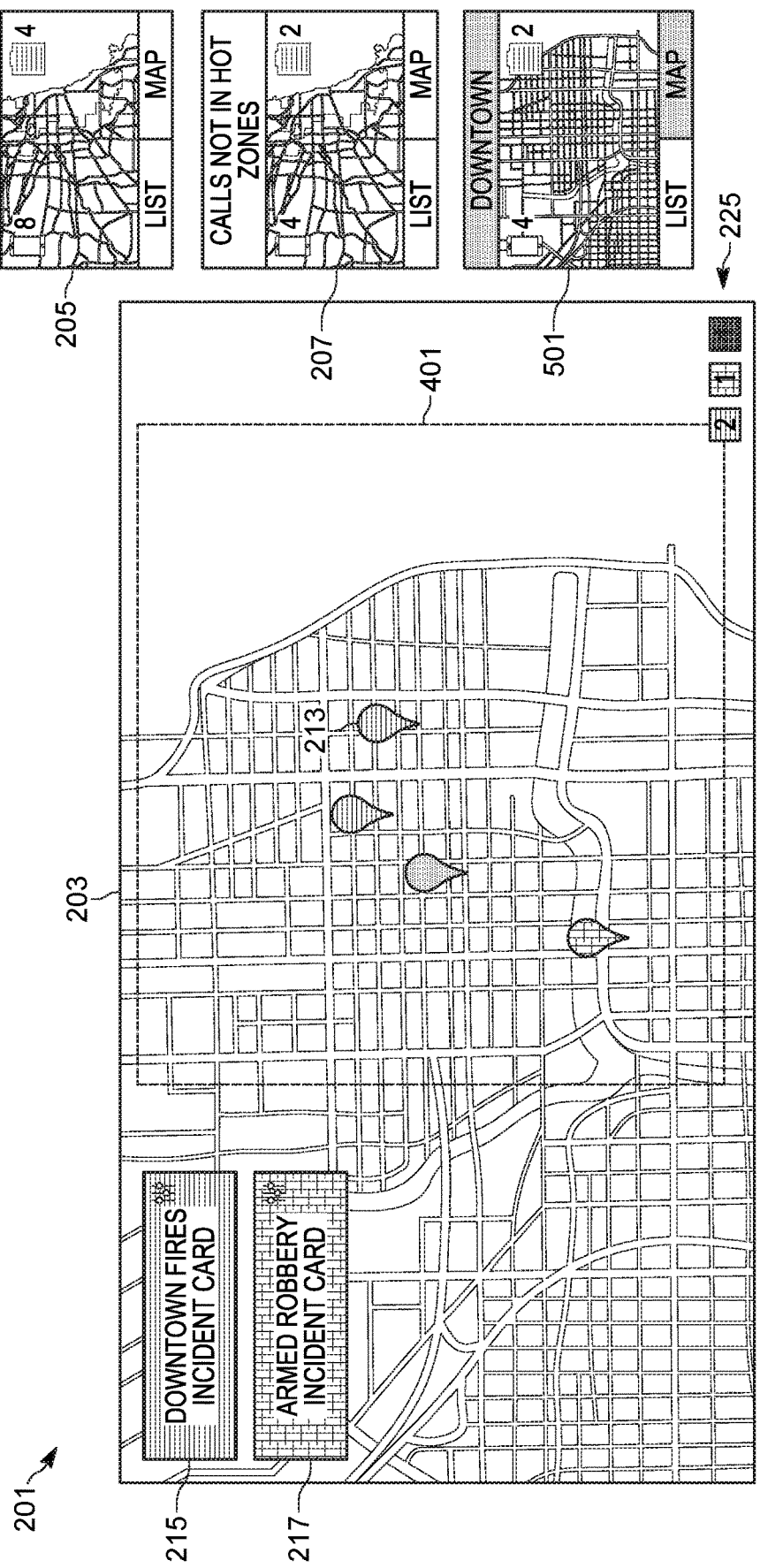
FIG. 5 is the map-view user interface of FIG. 2 with incident groups and call data filtered according to the newly created Hot Zone of FIG. 4.

FIG. 5 shows an example of the map-view user interface 201 after the new Hot Zone has been created. A new thumbnail icon (i.e., the "Downtown" thumbnail icon 501) has been added to the right side of the map-view user interface 201 and, in response to a user input selecting the "map" button of the downtown thumbnail icon 501, the map-view user interface 201 adjusts the zoom level of the displayed map 203 to show the geographic area of the newly created Hot Zone. In the example of FIG. 5, the map-view user interface 201 also continues to show the box 401 to provide a visual on-screen indication of the boundaries of the Hot Zone. In some implementations, the geographic area corresponding to the new Hot Zone thumbnail icon can be further adjusted, for example, by receiving a user input changing the location, size, or dimensions of the box 401.

As discussed above, the map-view user interface 201 generally displays "call icons" for each incoming/active call and "incident icons" for each ongoing incident while, in contrast, the list-view user interface 301 displays call cards and incident cards. However, in some implementations as illustrated in FIG. 5, the incident card for an ongoing incident can be selectively viewed in the map-view user interface 201 in response to a user selection of the incident icon. Conversely, the displayed "incident card" can be selectively reverted to an incident icon in response to a send user input. Similarly, a "call card" is displayed in the map-view user interface 201 in response to a user input selecting a call icon. With the call card displayed, the user can selectively assign a call to a new or ongoing incident or change the incident to which a call has been assigned.

Figure 6:
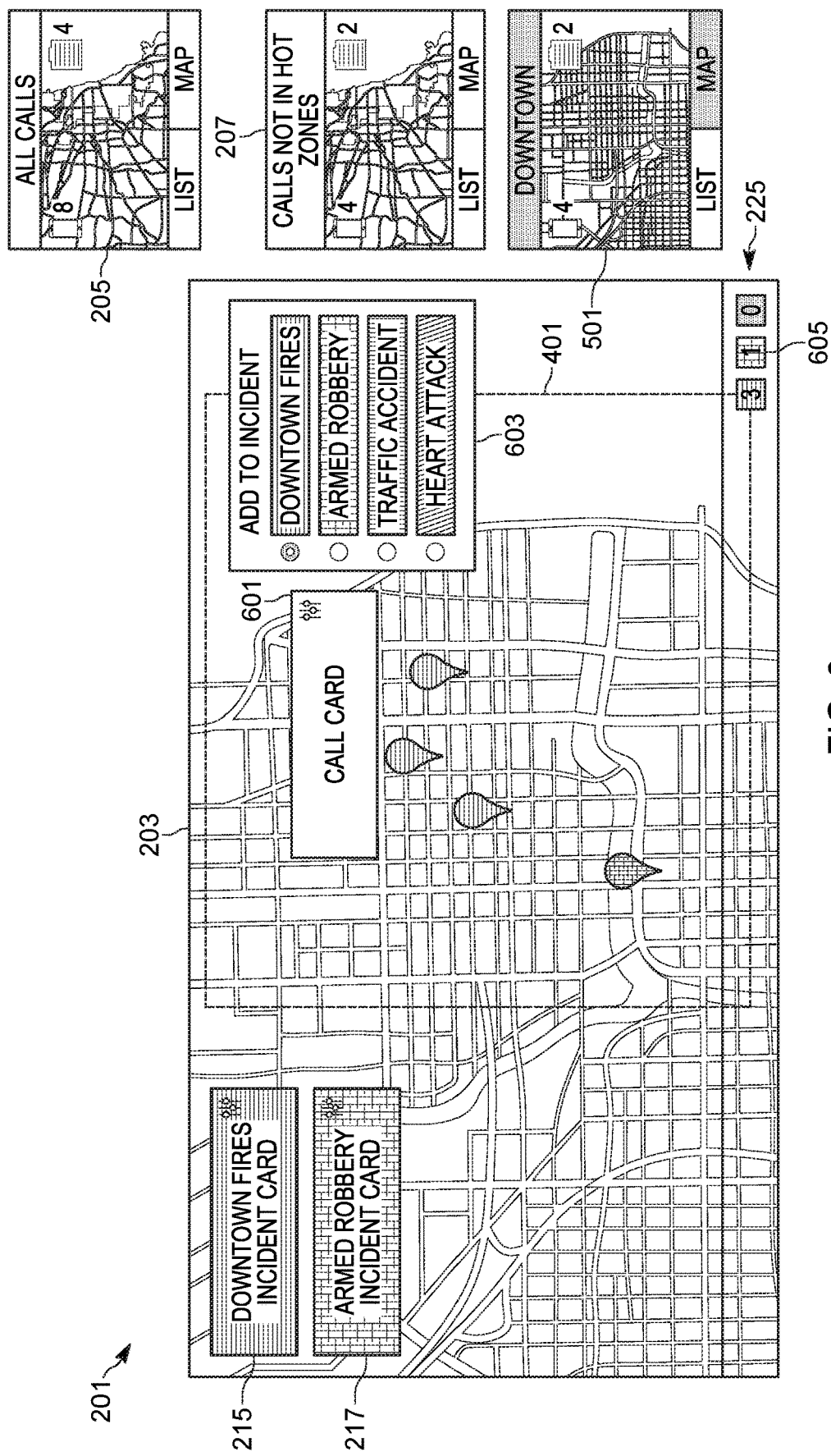
FIG. 6 is the map-view user interface of FIG. 5 showing an on-screen mechanism for assigning an incoming call to an incident group.

In the example of FIG. 5, there are four incoming calls within the geographic area corresponding to the downtown thumbnail icon 501. Two of these incoming calls have already been assigned to the "downtown fires" incident and one of the incoming calls has been assigned to the "armed robbery" incident. However, the fourth call has not yet been assigned to any incident. By selecting the call icon for the unassigned incoming call, the Call Card 601 for the unassigned incoming call is displayed as shown in FIG. 6. Because the incoming call has not yet been assigned to any incident, the call card 601 is color-coded black. Through the call card 601 interface, the user may access another pop-up window 603 that provides an option to assign the incoming call to one of the four ongoing incidents or to create a new incident to which the incoming call is then assigned. When the "downtown fires" incident is selected from the pop-up window 603, the call is assigned to the "downtown fires" incident and the color-coding of the call icon is updated (i.e., changed to blue).

Also, the incident filter button bar 225 is automatically updated in response to the incident assignment. In FIG. 5, the numbers on the incident filter buttons in the incident filter button bar 225 were "2", "1", and "1" (i.e., 2 calls assigned to the "downtown fires" incident, 1 call assigned to the "armed robbery" incident, and 1 call not assigned to any incident). In FIG. 6, after the previously unassigned call icon is assigned to the "downtown fires" incident, the numbers displayed on the incident filter buttons in the incident filter button bar 225 are changed to "3", "1", and "0" (i.e., 3 calls assigned to the "downtown fires" incident, 1 call assigned to the "armed robbery" incident, and 0 calls not assigned to any incident).

Figure 7:
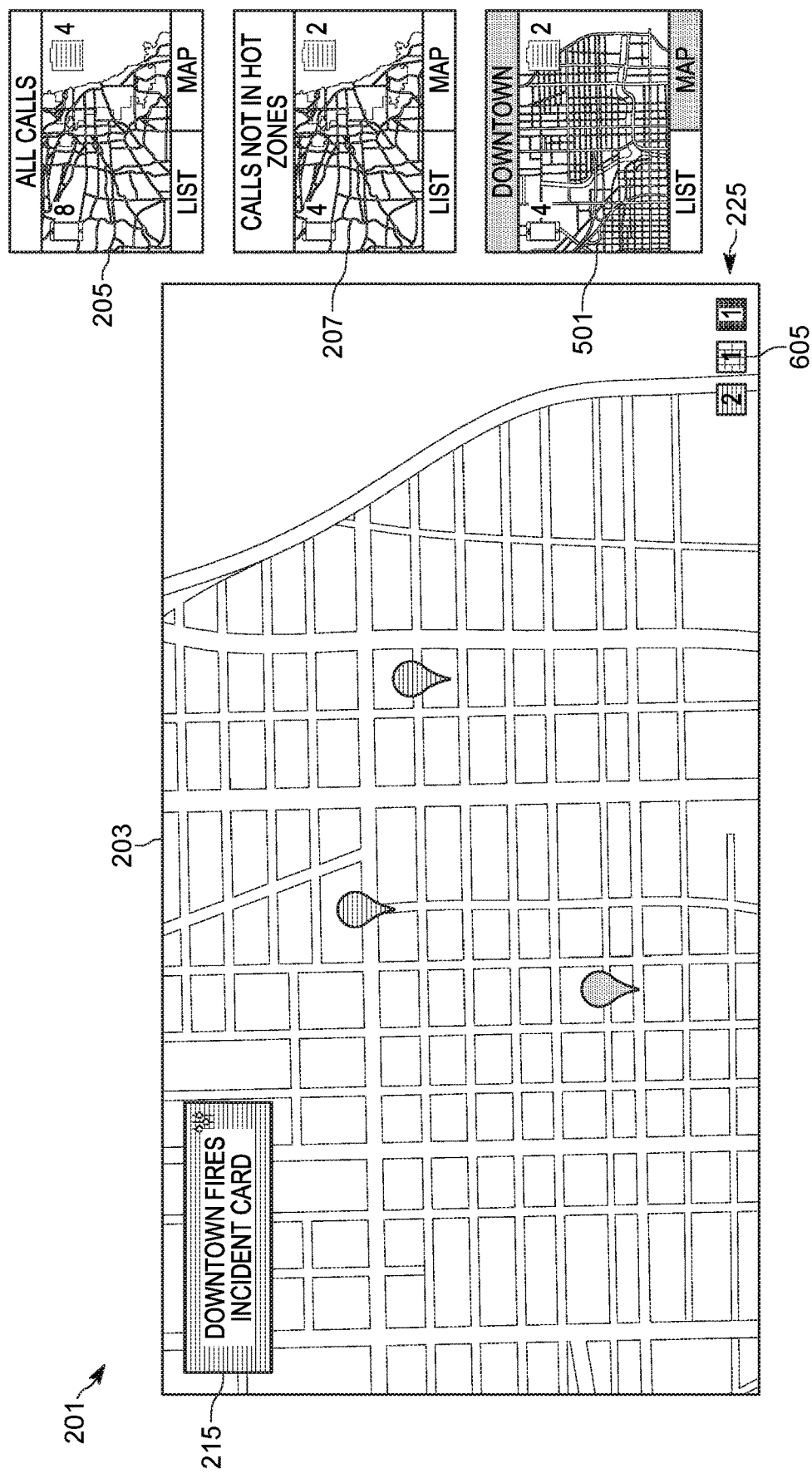
FIG. 7 is the map-view-user interface of FIG. 5 with incident groups and call data filtered according to an on-screen incident group filtering mechanism.

To demonstrate the functionality of the incident filter buttons of the incident filter buttons bar 225, FIG. 7 illustrates the changes to the map-view user interface 201 in response to a user selection of the incident filter button 605 for the "armed robbery" incident. As shown in FIG. 7, after incident filter button 605 has been selected, the call icon for any calls in the geographic area associated with the downtown thumbnail icon 501 are removed from the display and the "zoom" level of the displayed map 203 is adjusted to show only the other remaining calls within the geographic area associated with the downtown thumbnail icon 501. In some implementations, the selection of the incident filter button causes the call icon(s) to be removed entirely from the display while, in other implementations, selection of the incident filter button causes the associated call icon(s) to be displayed in a different manner (e.g., partially transparent or "grayed-out").

Also, in the example of FIG. 7, the incident icon/card 217 has also been removed from the map-view user interface 201. In some implementations, the incident icon/card associated with the selected incident filter button 605 is automatically removed in response to a selection of the incident filter button 605. However, in other implementations, the manner in which the incident card/icon 217 is displayed on the map-view user interface 201 would be altered in response to the selection of the incident filter button 605 (e.g., made partially transparent or "grayed-out").

In some implementations, the system is configured to show incident cards/icons on the map-view user interface 201 only when at least one call icon assigned to that incident is displayed on the map 203. Accordingly, in some implementations, when the zoom level of the map is adjusted such that call icons assigned to a particular incident are no longer in view, the incident icon associated with those call icons is also automatically removed. In some such implementations, when the zoom level of the map 203 is adjusted and/or the call icons are removed from the map in response to a selection of the incident filter button (e.g., incident filter button 605), the incident card/icon 217 is automatically removed because no associated call icons are currently in view or shown on the map 203.

Additionally, in response to a selection of an incident filter button in the incident filter button bar 225, the appearance of the selected incident filter button is adjusted to indicate that a filter is currently applied to the map-view. For example, in FIG. 7, in response to the selection of the incident filter button 605 to remove call icons for the "armed robbery" incident from the map display, the appearance of the incident filter button 605 changes from a solid color to a white icon with a colored border. In some implementations, multiple incident filter buttons may be selected (or deselected) concurrently and the color-to-white transition indicates which filters are currently applied for the displayed geographic area.

Figure 8:
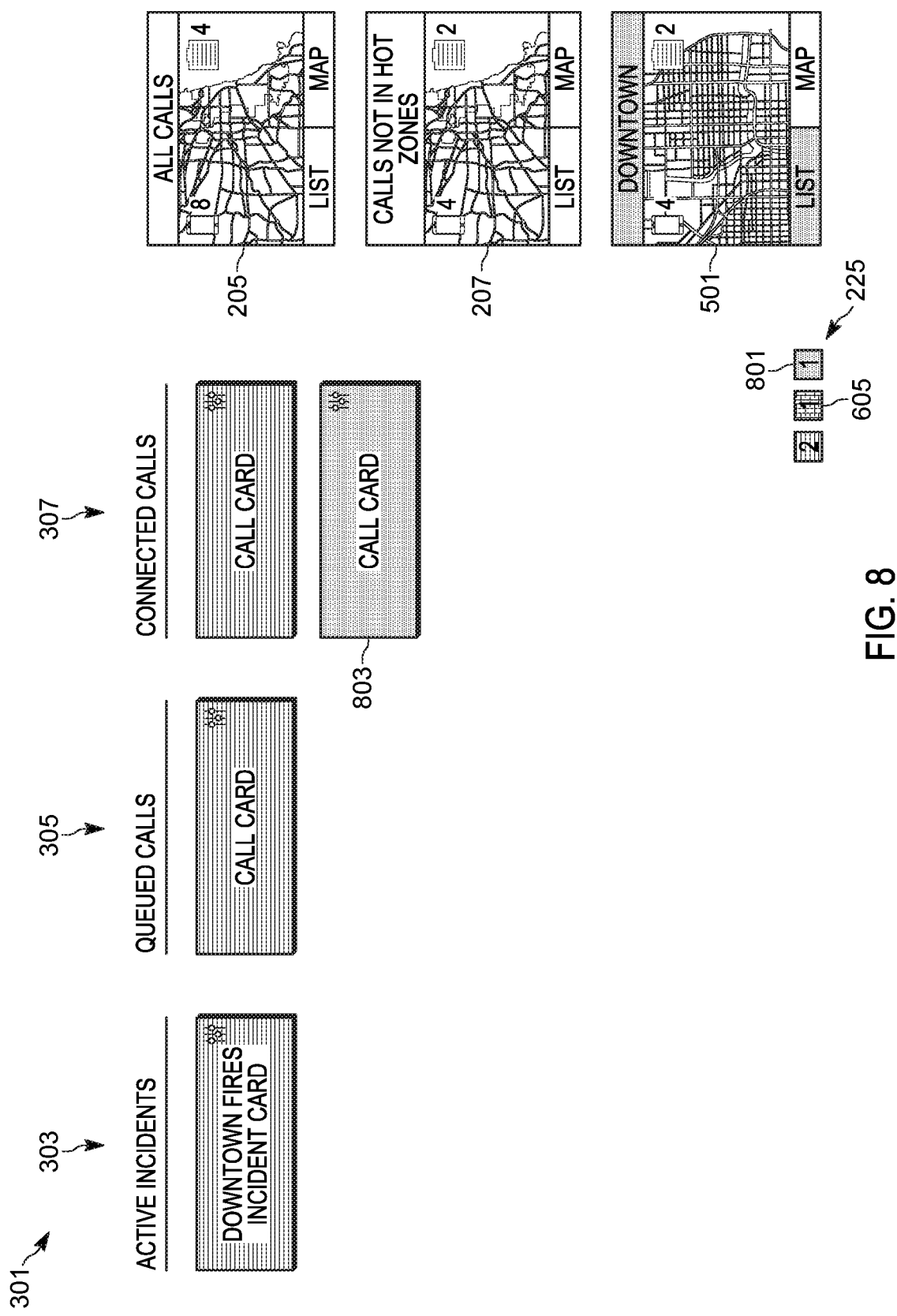
FIG. 8 is the list-view user interface of FIG. 3 with incident groups and call data filtered according to the newly created Hot Zone of FIG. 4 and further filtered according to the on-screen incident group filtering mechanism of FIG. 7.

The incident filter buttons in the incident filter button bar 225 operate similarly in the list-view user interface 301. In some implementations, filters applied in one user interface type area carried over to the other user interface type. FIG. 8 illustrates an example of the list-view user interface 301 that would be displayed if a user selected the "list" button for the downtown thumbnail icon 501 with the "armed robbery" incident filter applied (i.e., a transition from FIG. 7 to FIG. 8). Even though call icons within the geographic area associated with the downtown thumbnail icon 501 (i.e., the "downtown" Hot Zone") have been assigned to the "armed robbery" incident, the active incidents column 303 only displays an incident card for the "downtown fires" incident. Similarly, a Call Card for the incoming call assigned to the "armed robbery" incident does not appear in either the queued calls column 305 or the connected calls column 307. Also note that the selected incident filter button 605 is still shown as white with a colored border to indicate that a filter is currently applied.

Figure 9:
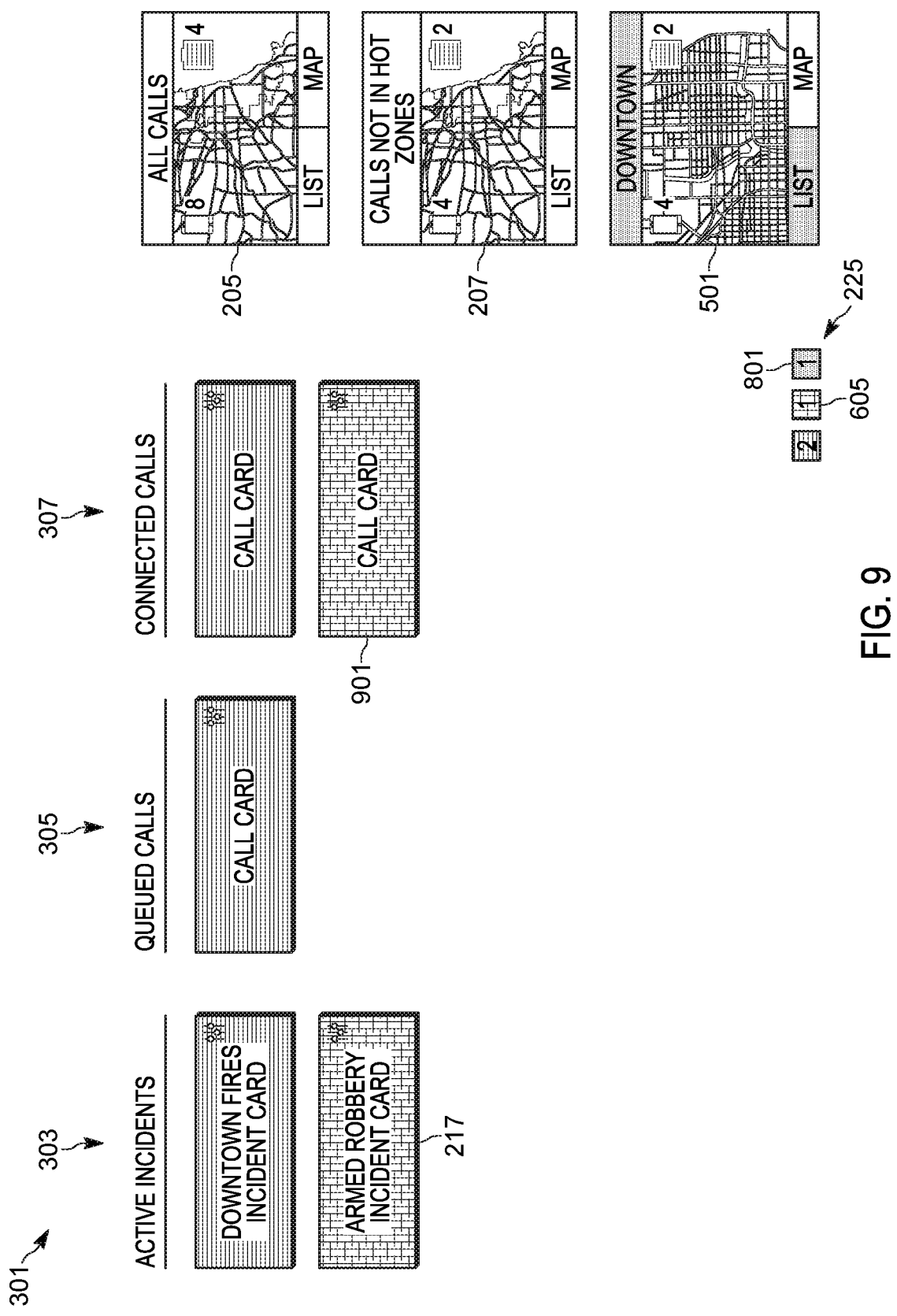
FIG. 9 is the list-view user interface of FIG. 8 after an adjustment to the on-screen incident group filtering mechanism.

From the screen as shown in FIG. 8, a user may select or deselect incident filter buttons from the incident filter button bar 225 to adjust the filters that are applied to the displayed incident cards and call cards. For example, in response to a selection of the incident filter button 801, the system will remove the Call Card 803 for a call that has not yet been assigned to any incident from the display. Conversely, in response to a deselection of the incident filter button 605, the incident card 217 for the "armed robbery" incident and call cards for any calls that have been assigned to the "armed robbery" incident will be added to the list-view display. FIG. 9 shows the updated list-view user interface after the incident filter button 605 has been deselected and the incident filter button 801 has been selected. In response to these changed incident filter button selections, the Call Card 803 (i.e., an "unassigned" call) is removed from the displayed cards in the connected calls column, a Call Card 901 (i.e., a connected call that has been assigned to the "armed robbery" incident) is added to the cards displayed in the connected calls column, and the "armed robbery" incident card 217 is added to the cards displayed in the active incidents column 303.

In the examples of FIGS. 5, 6, 7, 8, and 9, three different thumbnail icons are shown on the right side of the user interface: an "all calls" thumbnail icon 205, a "calls not in hot zones" thumbnail icon 207, and a "downtown" thumbnail icon 501. Each thumbnail icon corresponds to a different defined geographic area. As discussed above, the "downtown" thumbnail icon 501 corresponds to the geographic area of the newly created "downtown" Hot Zone (see, e.g., FIG. 5). Accordingly, a selection of the downtown thumbnail icon 501 (either the "list" button" or the "map" button) causes the system to display calls and incidents relating to the downtown Hot Zone.

The geographic area associated with the "all calls" thumbnail icon 205 is an entire service area of the incident management system 101. Accordingly, a selection of the "list" button of the "all calls" thumbnail 205 will cause all incidents and all calls to be displayed regardless of the source location of the calls. Similarly, a selection of the "map" button of the "all calls" thumbnail 205 will cause the system to display a map of the entire service area or, in some implementations, will cause the system to display a map zoomed to include all of the currently active calls. Regardless of the specific location of the active incoming calls, no call will be omitted when the "all calls" thumbnail icon is selected (unless/until one or more incident filter buttons from the incident filter buttons bar 225 are selected).

Figure 10:
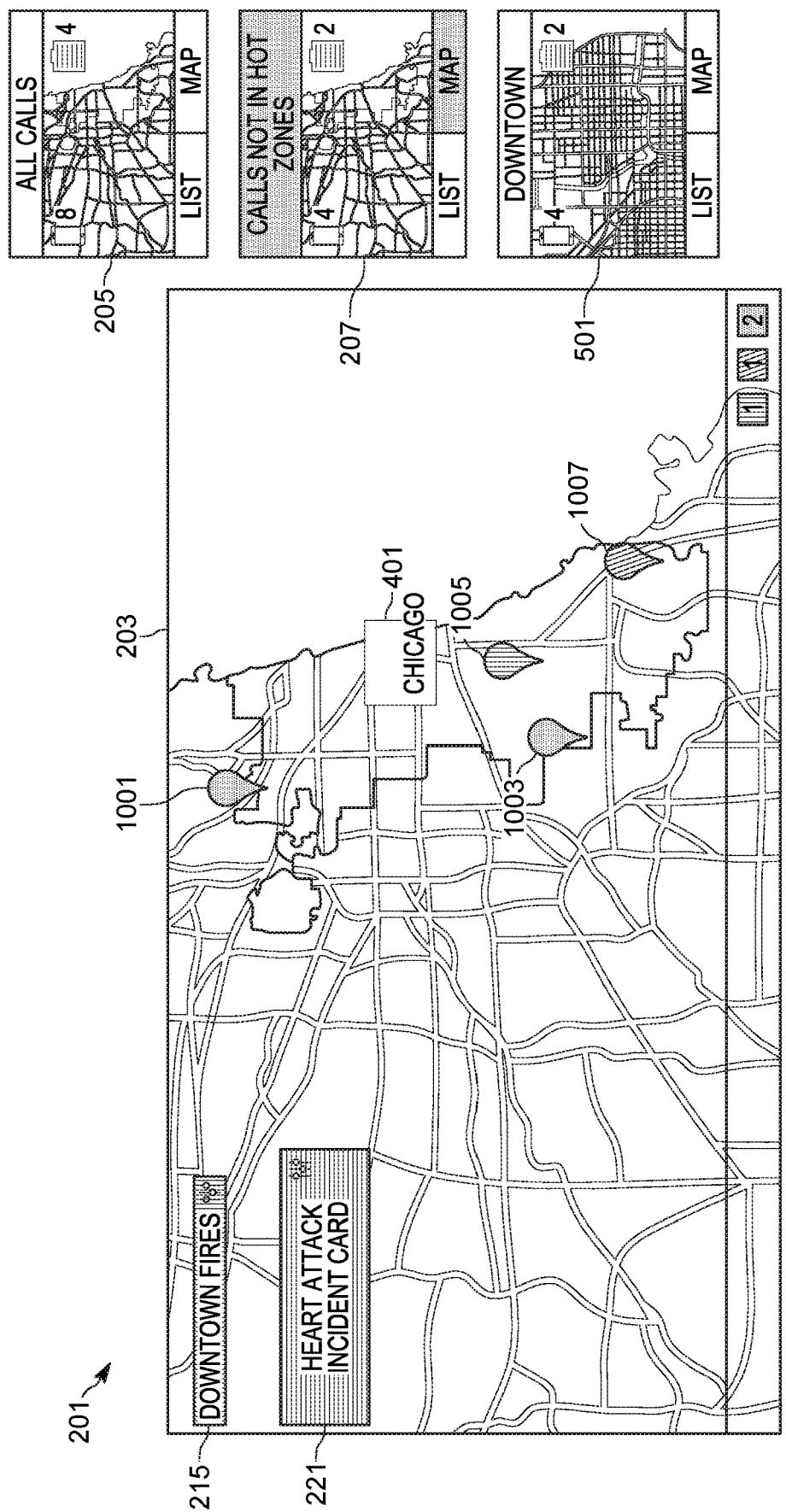
FIG. 10 is the map-view user interface of FIG. 2 with incident groups and call data filtered to highlight incident groups and call data that are outside of the created Hot Zone of FIG. 4.

The geographic area associated with the "calls not in hot zones" thumbnail icon 207 is also the entire service area of the incident management system 101 excluding any sub-areas that have been designated as Hot Zones (i.e., all parts of the geographic area corresponding to the "all calls" thumbnail 205 that are not also part of the geopgraphic area corresponding to any of the other "zone" thumbnail icons). FIG. 10 illustrates an example of the map-view user interface 201 displayed in response to a selection of the "map" button of the "calls not in hot zones" thumbnail icon 207. The zoom-level of the map 203 displayed on the map-view user interface 201 is set to include the entire service area of the incident management system 101. However, in some implementations, the system may be configured to automatically (or in response to a user preference setting) adjust the zoom level of the map only to the extent necessary to include all of the active/incoming calls associated with the "calls not in hot zones" thumbnail icon 207. In this example, the system is also configured to show an indication of any Hot Zones (e.g., the downtown Hot Zone 401) on the map 203. However, call icons for any active/incoming calls within the downtown Hot Zone 401 are not displayed on the map 203. Instead, the map-view user interface only shows call icons for active/incoming calls that are not located within any defined Hot Zone.

In this particular example, there are four active calls that were received from locations outside of the downtown Hot Zone. Call icons 1001 and 1003 indicate the source locations of two incoming calls that have not yet been assigned to any incident. Call icon 1005 indicates the source location of an incoming call that has been assigned to the "downtown fires" incident and call icon 1007 indicates the source location of an incoming call that has been assigned to a "heart attack" incident. Accordingly, the incident filter button bar 225 has been updated to include only three incident filter buttons with colors and numbers associated with call icons located outside of any defined Hot Zones. Similarly, appropriate incident cards are displayed on the map-view user interface. Because there is one call located outside of any defined Hot Zones for each of the "downtown fires" incident and the "heart attack" incident, the "downtown fires" incident card 215 and the "heart attack" incident card 221 are displayed on the map-view user interface 201. Again, as noted above, the incident icons/cards can be selectively expanded to an "incident card" display and selectively collapsed to an "incident icon" display. In the example of FIG. 9, the "heart attack" incident card/icon 221 has been expanded to the "incident card" display while the "downtown fires" incident card/icon 215 has been collapsed to the "incident icon" display.

Although the examples of FIGS. 5, 6, 7, 8, 9, and 10 illustrate only a single created Hot Zone, multiple different concurrent Hot Zones can be created and, in some implementations, Hot Zones may be created with overlapping geographic areas. For each additional Hot Zone that is created, a new thumbnail icon is added to the user interface display. In some implementations, all users are able to create new Hot Zones and access any Hot Zone via the thumbnail icons. However, in some implementations, access levels are defined to allow only certain users (e.g., supervisors or dispatchers, but not call takers) to create new Hot Zones. Furthermore, in some implementations and/or situations, a user may be assigned to one or more specific Hot Zones and, accordingly, the access levels may be defined to allow that user to only view and interact with thumbnail icons for Hot Zones that have been assigned to that user.

Figure 11:
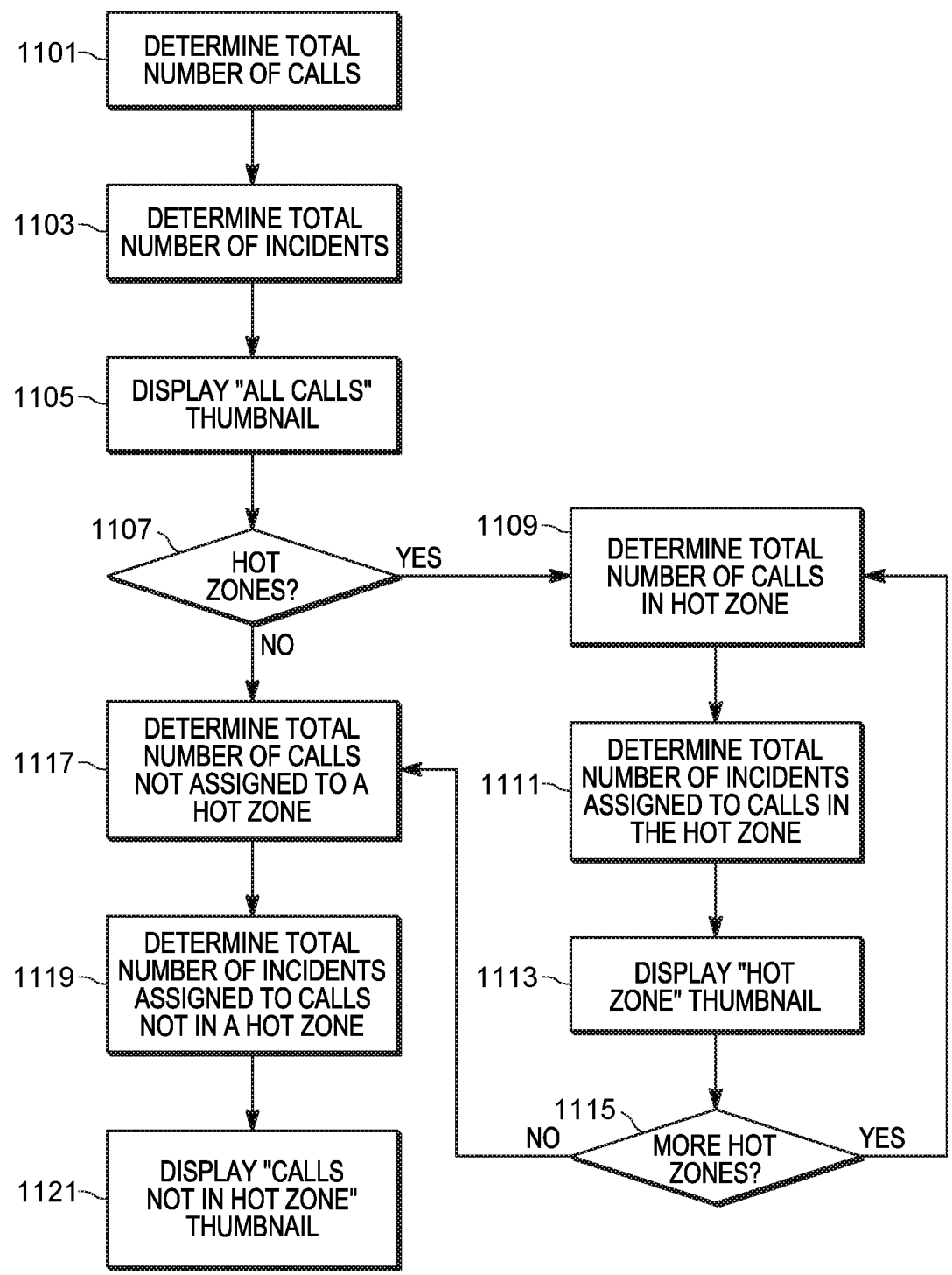
FIG. 11 is a flowchart of a method for displaying graphical thumbnail controls for both the map-view user interface and the list-view user interface in the incident management system of FIG. 1.

FIGS. 11, 12, 13, 14, 15, and 16 provide examples in flowchart form of various different methods that the incident management system 101 is configured to perform in certain implementations. FIG. 11 illustrates an example of a method performed by the incident management system 101 in order to display the user interface selection thumbnail icons. First, the system determines a total number of incoming/active calls being handled by the incident management system (step 1101) and a total number of ongoing incidents to which calls have been assigned (step 1103). The system then generates and displays an "all calls" thumbnail including a thumbnail image of the entire service area of the incident management system, a number of total active/incoming calls, and a number of total ongoing incidents (step 1105).

The system then determines whether any Hot Zones have been created (step 1107). If so, the system determines a number of calls in a first Hot Zone (step 1109) and a total number of incidents to which calls in that first Hot Zone have been assigned (step 1111) and then displays a thumbnail icon for that first Hot Zone including a thumbnail image of the geographic area of the first Hot Zone, the number of incoming/active calls received from locations within that first Hot Zone, and the number of ongoing incidents to which calls in that first Hot Zone have been assigned (step 1113). If there are any additional Hot Zones (step 1115), the steps 1109, 1111, and 1113 are repeated for each additional Hot Zone until thumbnail icons have been generated and displayed for each defined Hot Zone.

Once the system has generated a thumbnail icon for each defined Hot Zone (or if there are no defined Hot Zones), the system determines a total number of incoming/active calls that have been received from locations outside of any of the defined Hot Zones (step 1117) and determines a total number of incidents to which those calls have been assigned (step 1119). The system then generates and displays a thumbnail icon for "calls not in hot zone" including a thumbnail image of the entire service area, the number of incoming/active calls received from locations outside of any existing Hot Zones, and the number of incidents to which those calls have been assigned (step 1121). The process of FIG. 11 is performed upon system start up and is repeated periodically and/or each time a new Hot Zone is created.

Figure 12:
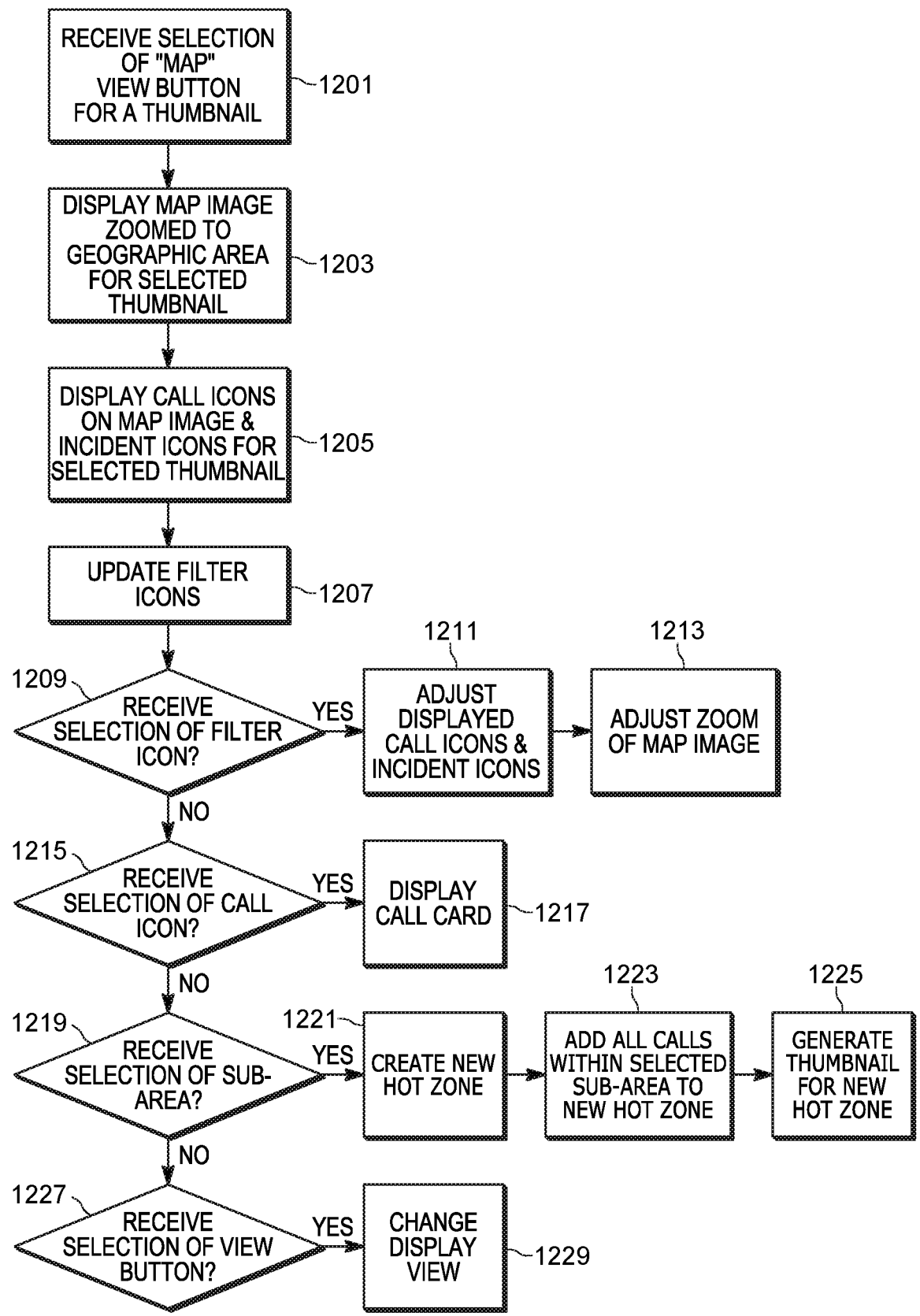
FIG. 12 is a flowchart of a method for displaying the map-view user interface and for managing one or more incidents in response to user inputs received through the map-view user interface in the incident management system of FIG. 1.

FIG. 12 is an example of some of the functionality provided by the map-view user interface 201 for managing incidents. In response to a selection of the "map" view button for a thumbnail icon (step 1201), the system displays a map image zoomed to a geographic area corresponding to the selected thumbnail icon (step 1203). The system displays call icons on the map image indicating the source location of any incoming calls received from within the defined geographic area and incident icons for any incidents to which one or more of the calls in that defined geographic area have been assigned (step 1205).

The system also updated the incident filter button icons displayed in the incident filter button bar 225 (step 1207). In response to receiving a selection of a filter icon button (step 1209), the system adjusts the displayed call icons and incident icons (i.e., by removing, adding, or adjusting the display for any calls/incidents associated with the selected incident filter button) (step 1211) and then adjusts the zoom of the map based on the remaining displayed call icons (step 1213).

In response to receiving a selection of a displayed call icon (step 1215), the system displays the Call Card for the selected call icon (step 1217). In some implementations, as discuss below, the displayed Call Card provides additional functionality including, for example, a button to initiate a connection to the incoming call corresponding to the Call Card.

In response to receiving a selection of a smaller geographic area on the displayed map (step 1219), the system creates a new Hot Zone (step 1221). All incoming calls received from locations within the newly defined Hot Zone are added to that new Hot Zone (step 1223) and a new thumbnail icon is generated and displayed for the new Hot Zone (step 1225).

In response to receiving a selection of another view button (step 1227), the system changes the display view (step 1229). For example, in response to receiving a selection of the "list" button for the same thumbnail icon as the currently displayed map-view user interface 201, the system changes the display from a map-view user interface 201 to a list-view user interface 301 for the same geographic area. Similarly, in response to receiving a selection of the "list" button or the "map" button for a different thumbnail icon, the system changes the display to the map-view user interface 201 or the list-view user interface 301 corresponding to the geographic area of the selected thumbnail icon. In some implementations, the system may be further configured to provide a visual or audible indication of any changes within a particular geographic area since a user last viewed the map-view user interface 201 or the list-view user interface for that geographic area. For example, the system may be configured to generate a visual animation "pulsing" on the display of any incident icons or call icons corresponding to incidents or calls, respectively, that have been added since the particular user last visited the thumbnail for a particular "hot zone."

Figure 13:
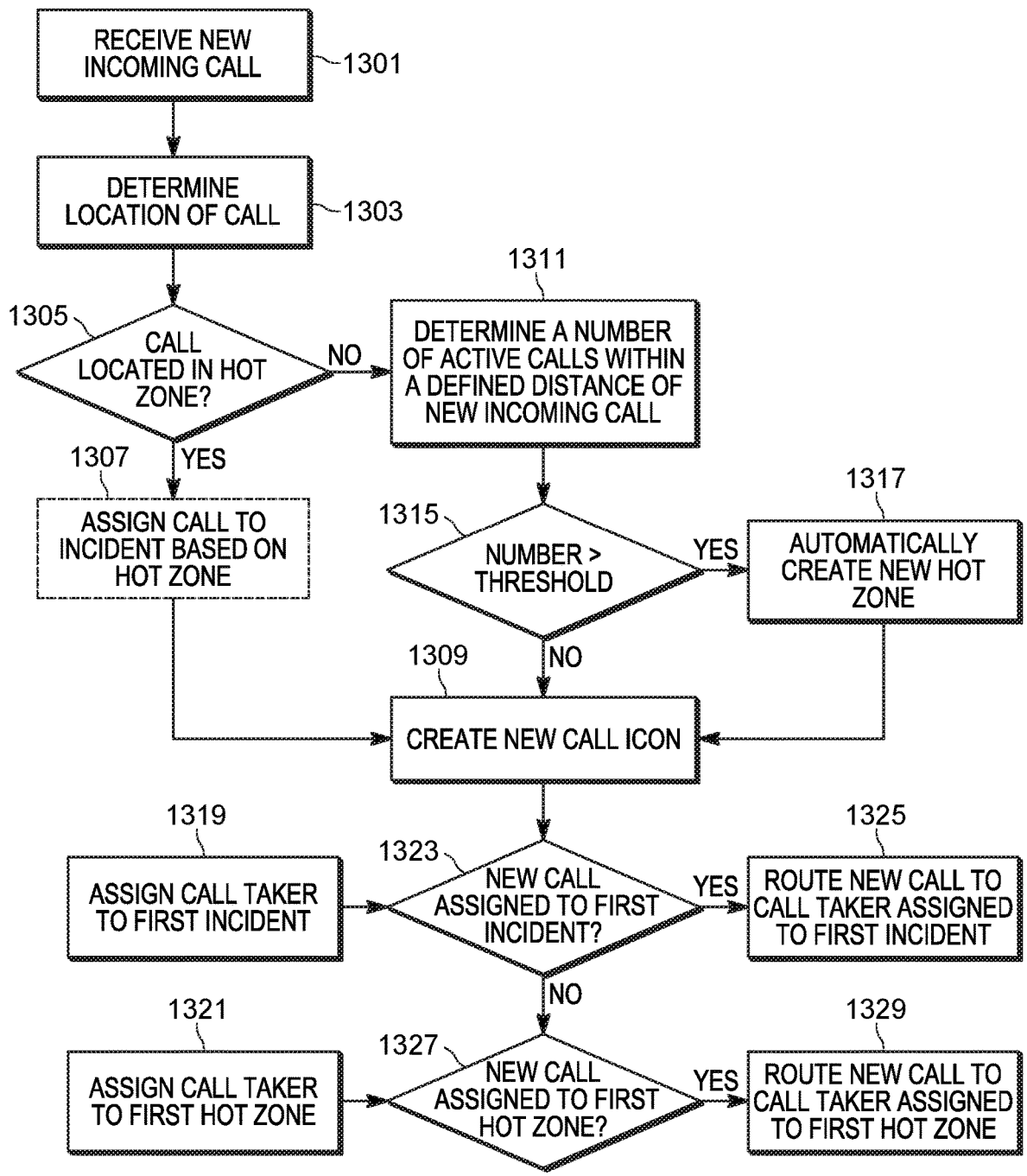
FIG. 13 is a flowchart of a method for managing and routing incoming calls using the incident management system of FIG. 1.

FIG. 13 illustrates an example of a method for receiving and routing incoming calls using incident management system 101 including the map-view user interface 201 and the list-view user interface 301. When a new incoming call is received (step 1301), the system determines a source location of that call (i.e., a location from which that incoming call was made) (step 1303). In some implementations, the location of the incoming call may be determined using, for example, automated mechanism such as caller ID or cell phone triangulation or manual mechanisms such as an operator/dispatcher asking the caller to verbally identify their location.

If the new incoming call is located in an existing Hot Zone (step 1305) and that Hot Zone has been associated with a particular ongoing incident, in some implementations, the system will automatically assign the new incoming call to the incident associated with the Hot Zone location (step 1307). A new call icon is then created for the new incoming call (step 1309) and is displayed to users currently viewing the map-view user interface 201 for the particular Hot Zone or the "all calls" map-view user interface 201. Similarly, a new Call Card is created for the new incoming call and is viewable in the list-view user interface 301 or by selecting the newly created call icon in the map-view user interface 201.

However, if the source location of the new incoming call is not located in an existing Hot Zone, the system may automatically determine whether a new Hot Zone might be created. The system first determines a number of active calls within a defined geographic distance from the source location of the new incoming call (step 1311) and, if that number exceeds a threshold (step 1315), a new Hot Zone is automatically created (step 1315). In some implementations, new Hot Zone may be automatically created based only on call volume/distance as illustrated in the example of FIG. 13. However, in some implementations, new Hot Zones are automatically created in response to determining that a number of incoming calls have been assigned to the same incident. In still other implementations, new Hot Zones are created based on manual input received from a user as discussed above in reference to FIG. 5.

Whether a new Hot Zone is created, whether the incoming call is located within an existing Hot Zone, or whether the new incoming call is not located in any Hot Zone, a new call icon and call card are generated for the new incoming call and displayed on the user interface as discussed in the various examples above (step 1309).

When using the incident management system, call takers may be assigned to one or more particular incidents (step 1319) and/or one or more particular geographic locations (i.e., Hot Zones) (step 1321). These assignments can be updated and changed based, for example, on the current call volume and the currently number/location of ongoing incidents. If the new incoming call has been automatically (or manually) assigned to a first incident (step 1323), then the call is automatically routed by the incident management system 101 to a call taker that has been assigned to that specific incident (step 1325). Similarly, if the new incoming call is received from a location in a defined Hot Zone (step 1327), then the call is automatically routed by the incident management system 101 to a call taker that has been assigned to that specific Hot Zone (step 1329). In this way, multiple incoming calls that are all related to the same ongoing incident (or potentially related incidents) can be automatically routed to the same call taker (or group of call takers).

Figure 14:
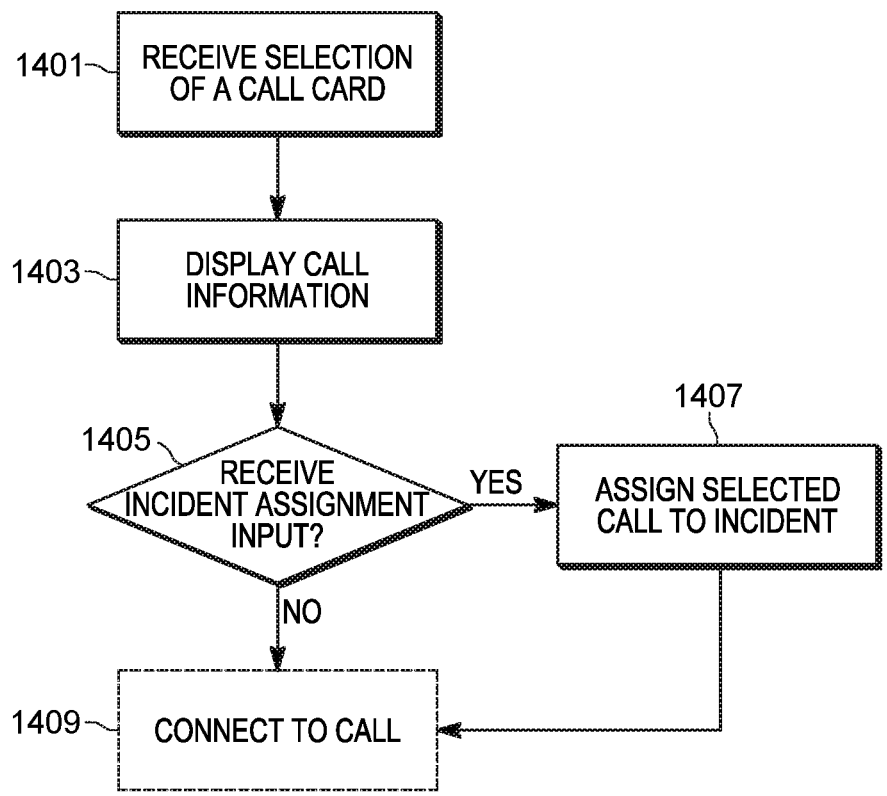
FIG. 14 is a flowchart of a method for operating the incident management system of FIG. 1 in response to a user selection of an on-screen "call card."

FIG. 14 illustrates an example of a method for managing an incident using displayed Call Cards in the graphical user interface. In response to a user selection of a displayed Call Card (step 1401), the system displays call information (step 1403) including, for example, a name and location of the caller and a summary or notes of information provided by the caller regarding an incident. Using the Call Card interface, a user may also define an ongoing incident for the incoming call (i.e., the "assigned incident") (step 1405) and the system will assign & associate that call with that incident (step 1407). In some implementations, a user can selectively connect to an incoming call through the Call Card interface (step 1409).

Figure 15:
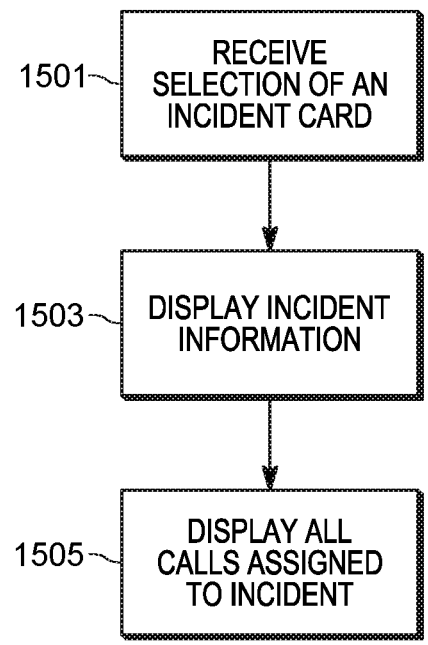
FIG. 15 is a flowchart of a method for operating the incident management system of FIG. 1 in response to a user selection of an on-screen "incident card."

FIG. 15 illustrates an example of a method for managing an incident using display incident cards in the incident management system 101. In response to receiving a user selection of an incident card (step 1501), the system displays incident information including, for example, geographic information, notes provided by callers, and status updates provided by incident response personnel in the field. A selection of the incident card may also cause the system to display all calls assigned to the incident (step 1505), for example, in a list format or by highlighting displayed Call Cards and/or Call Icons for calls that have been assigned to the selected incident.

Figure 16:
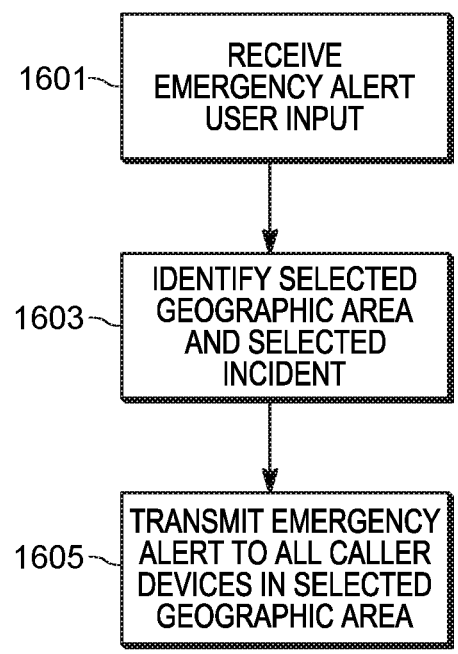
FIG. 16 is a flowchart of a method for transmitting an outgoing emergency alert by the incident management system of FIG. 1.

Although the examples described above are primarily related to mechanisms for managing an incident based on incoming calls, in some implementations, the incident management system may be configured to use the geographic context information such as, for example, defined Hot Zones, to initiate outgoing emergency messages (i.e., reverse 9-1-1). As illustrated in the method of FIG. 16, the incident management system may be configured to generate an emergency alert either automatically or in response to a user input (step 1601). In response to the initiated emergency alert, the system identifies a selected geographic area and a selected incident (step 1603). The system then automatically transmits an emergency alert message (e.g., an audio phone call and/or text message) to a plurality of user devices (e.g., telephones) located in a selected geographic area (step 1605). For example, in the "downtown fires" incident situation illustrated in FIG. 6, an emergency alert might be send to every caller device located within the defined "downtown" Hot Zone with information about the status of the downtown fire including, for example, evacuation information.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

For example, several of the examples above use the phrase "hot zone" to refer to "zones" created for incident management and "hot zone thumbnail icon" to refer to the thumbnail icons corresponding to the geographic areas defined by the corresponding "zone." The phrase "hot zone" in these examples refers to a geographic area of focus relating to an increased volume and/or concentration of calls. However, in some implementations, the methods and systems described herein may be applied to any geographic area defined as a "zone" regardless of the purpose for which the "zone" is defined. Accordingly, at least some of the examples described above utilizing the phrases "hot zone" and "hot zone thumbnail icon" can be applied more generally using terminology such as, for example, "zone" or "zone thumbnail icon."

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for operating a computer-based incident management system, the method comprising:
  displaying on a graphical display one or more thumbnail icons, each thumbnail icon of the one or more thumbnail icons corresponding to a different defined geographic area;
  receiving a user input selecting a thumbnail icon of the one or more thumbnail icons; and
  displaying on the graphical display a first user interface screen in response to receiving the user input selecting the thumbnail icon, wherein the first user interface screen includes
    the one or more thumbnail icons,
    a map identifying a defined geographic area corresponding to the selected thumbnail icon,
    a plurality of call icons each corresponding to a different one of a plurality of active incoming calls received from within the defined geographic area corresponding to the selected thumbnail icon, wherein each call icon of the plurality of call icons is positioned at a location on the map corresponding to a geographic location of the active incoming call, wherein at least one call icon of the plurality of call icons is assigned to an incident, and
    at least one incident icon each corresponding to a different incident to which at least one call icon of the plurality of call icons is assigned.

2. The method of claim 1, wherein displaying the one or more thumbnail icons includes
  displaying a first number on each thumbnail icon indicating a number of active incoming calls received from within the defined geographic area corresponding to the thumbnail icon, and
  displaying a second number on each thumbnail icon indicating a number of different incidents to which active incoming calls received from within the defined geographic area corresponding to the thumbnail icon have been assigned.

3. The method of claim 1, wherein displaying the one or more thumbnail icons includes
  displaying a first thumbnail icon corresponding to a geographic area including all active incoming calls,
  displaying one or more zone thumbnail icons, wherein each zone thumbnail icon corresponds to a different defined geographic area located within the geographic area corresponding to the first thumbnail icon, and
  displaying a second thumbnail icon corresponding to a geographic area including all parts of the geographic area corresponding to the first thumbnail icon that are not also part of the geographic area corresponding to any of the one or more zone thumbnail icons.

4. The method of claim 1, further comprising:
  receiving a zone selection input defining a geographic area within the map displayed on the first user interface screen;
  displaying a new thumbnail icon corresponding to the geographic area defined by the zone selection input;
  receiving a user input selecting the new thumbnail icon; and
  displaying the first user interface screen including a map identifying the geographic area defined by the zone selection input.

5. The method of claim 1, further comprising:
  automatically defining an incident zone in response to a plurality of active incoming calls being assigned to a same incident, wherein the incident zone is defined as a geographic area including all active incoming calls of the plurality of active incoming calls that have been assigned to the same incident; and
  displaying a new thumbnail icon corresponding to the geographic area defined by the incident zone.

6. The method of claim 1, wherein displaying the one or more thumbnail icons includes displaying an incident zone thumbnail icon, wherein the incident zone thumbnail icon corresponds to a geographic area including a plurality of active incoming calls related to a first incident, the method further comprising:
  assigning one or more call takers to the first incident;
  receiving a new active incoming call from a location within the geographic area corresponding to the incident zone thumbnail icon; and
  automatically routing the new active incoming call to the one or more call takers assigned to the first incident.

7. The method of claim 1, further comprising:
  receiving a first user input via the first user interface screen selecting a first call icon of the plurality of call icons;
  receiving a second user input via the first user interface screen defining an assigned incident for the first call icon; and
  assigning the first call icon to the assigned incident in response to receiving the second user input.

8. The method of claim 1, wherein displaying the at least one incident icon includes displaying a plurality of color-coded incident icons on the first user interface screen, wherein each incident icon of the plurality of color-coded incident icons includes a different color-coding color, and
  wherein displaying the plurality of call icons includes displaying one or more call icons assigned to a first incident, wherein each call icon of the one or more call icons assigned to the first incident includes a same color-coding color as a color-coding color of an incident icon for the first incident.

9. The method of claim 1, wherein displaying on the graphical display the first user interface screen includes displaying a plurality of incident filter buttons, the method further comprising:
  receiving a first user input via the first user interface screen selecting a first incident filter button of the plurality of incident filter buttons;
  displaying on the map all call icons in the defined geographic area corresponding to the selected thumbnail that are assigned to a first incident corresponding to the first incident filter button in response to receiving the first user input; and
  adjusting the displayed map to filter any call icons in the defined geographic area that are not assigned to a selected incident filter button of the plurality of incident filter buttons.

10. The method of claim 9, wherein adjusting the displayed map to filter any call icons in the defined geographic area that are not assigned to a selected incident filter button of the plurality of incident filter buttons includes removing from the displayed map any call icons in the defined geographic area that are not assigned to a selected incident filter button of the plurality of incident filter buttons.

11. The method of claim 1, wherein displaying on the graphical display the first user interface screen includes displaying a plurality of incident filter buttons, the method further comprising:
receiving a first user input via the first user interface screen selecting a first incident filter button of the plurality of incident filter buttons; and
adjusting the displayed map to filter any call icons that are assigned to a first incident corresponding to the first incident filter button in response to receiving the selection of the first incident filter button.

12. The method of claim 1, further comprising:
receiving a first user input via the first user interface screen selecting a first incident icon of the at least one incident icon;
displaying information regarding a first incident corresponding to the first incident icon in response to receiving the selection of the first incident icon, wherein displaying information regarding the first incident includes displaying information regarding active incoming calls assigned to the first incident;
receiving a second user input via the first user interface screen selecting a first call icon of the plurality of call icons; and
displaying information regarding the active incoming call corresponding to the first call icon in response to receiving the selection of the first call icon.

13. The method of claim 12, further comprising connecting a user to the active incoming call corresponding to the first call icon in response to receiving the selection of the first call icon.

14. The method of claim 1, further comprising:
receiving a first user input via the first user interface screen initiating an outgoing emergency message; and
transmitting the outgoing emergency message to a plurality of user devices located within the defined geographic area corresponding to the selected thumbnail in response to receiving the first user input.

15. The method of claim 1, wherein receiving the user input selecting the thumbnail icon of the one or more thumbnail icons includes receiving the user input selecting a map-view option for the thumbnail icon of the one or more thumbnail icons, the method further comprising:
receiving a user input selecting a list-view option for the thumbnail icon of the one or more thumbnail icons;
displaying on the graphical display a second user interface screen in response to receiving the user input selecting the list-view option for the thumbnail of the one or more thumbnail icons, wherein the second user interface screen includes a plurality of list icons arranged in columns, the plurality of list icons including
a first subset of list icons, wherein each list icon of the first subset of list icons corresponds to a different incoming call received from within the defined geographic area corresponding to the selected thumbnail icon, wherein list icons corresponding to connected calls are displayed in a connected calls column on the second user interface screen, and wherein list icons corresponding to queued calls are displayed in a queued calls column on the second user interface screen, and
a second subset of list icons, wherein each list icon of the second subset of list icons corresponds to a different active incident to which one or more incoming calls from within the defined geographic area corresponding to the selected thumbnail icon have been assigned, wherein list icons corresponding to active incidents are displayed in an active incidents column on the second user interface screen.

16. The method of claim 1, further comprising:
receiving a new incoming call;
identifying a geographic location of the new incoming call; and
displaying a new call icon on the map in response to determining that the geographic location of the new incoming call is within the defined geographic area corresponding to the selected thumbnail icon.

17. A computer-based incident management system comprising:
a graphical display;
a user input device; and
an electronic processor configured to
display on the graphical display one or more thumbnail icons, each thumbnail icon of the one or more thumbnail icons corresponding to a different defined geographic area,
receiving a user input via the user input device selecting a thumbnail icon of the one or more thumbnail icons, and
displaying on the graphical display a first user interface screen in response to receiving the user input selecting the thumbnail icon, wherein the first user interface screen includes
the one or more thumbnail icons,
a map identifying a defined geographic area corresponding to the selected thumbnail icon,
a plurality of call icons each corresponding to a different one of a plurality of active incoming calls received from within the defined geographic area corresponding to the selected thumbnail icon, wherein each call icon of the plurality of call icons is positioned at a location on the map corresponding to a geographic location of the active incoming call, wherein at least one call icon of the plurality of call icons is assigned to an incident, and
at least one incident icon each corresponding to a different incident to which at least one call icon of the plurality of call icons is assigned.

18. The method of claim 1, wherein displaying on the graphical display the first user interface screen includes displaying the one or more thumbnail icons positioned at a location on the first user interface screen that does not overlap with the displayed map, wherein each thumbnail icon of the one or more thumbnail icons includes a thumbnail map image of the defined geographic area corresponding to the thumbnail icon.

19. The method of claim 1, further comprising displaying on the graphical display one or more map view buttons each corresponding to a different one of the one or more displayed thumbnail icons, and wherein receiving the user input selecting the thumbnail icon of the plurality of thumbnail icons includes receiving a user input selecting a map view button corresponding to the selecting thumbnail icon.

20. The method of claim 1, wherein the plurality of call icons displayed on the first user interface screen is altered in response to a selection of a different thumbnail icon of the one or more thumbnail icons.

* * * * *